Sept. 2, 1952        S. LANDO        2,608,784
SIGNALING DEVICE
Filed April 15, 1950
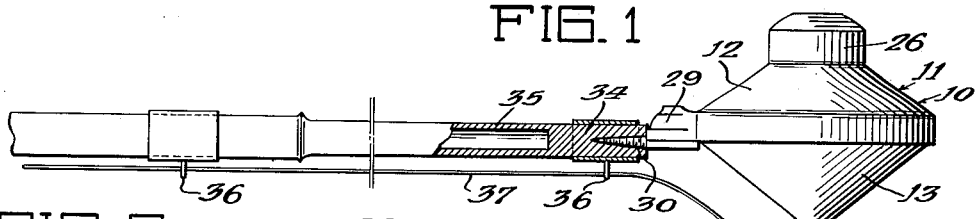
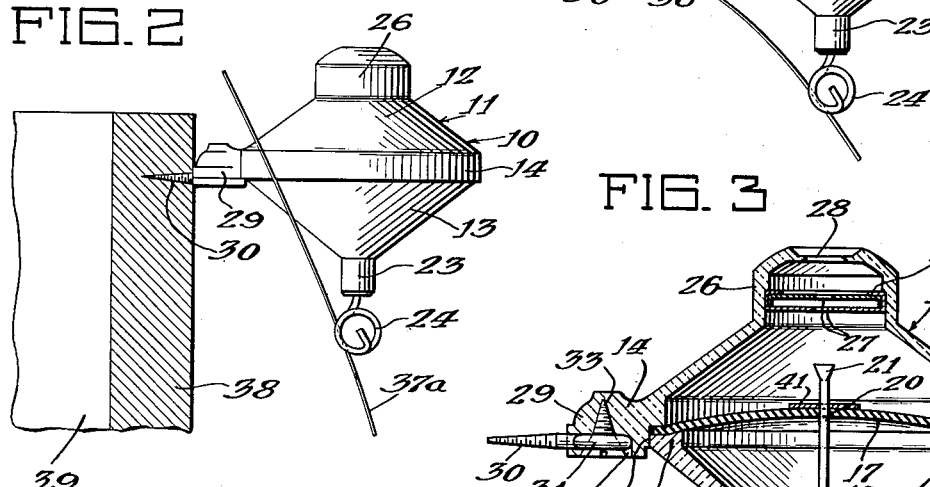
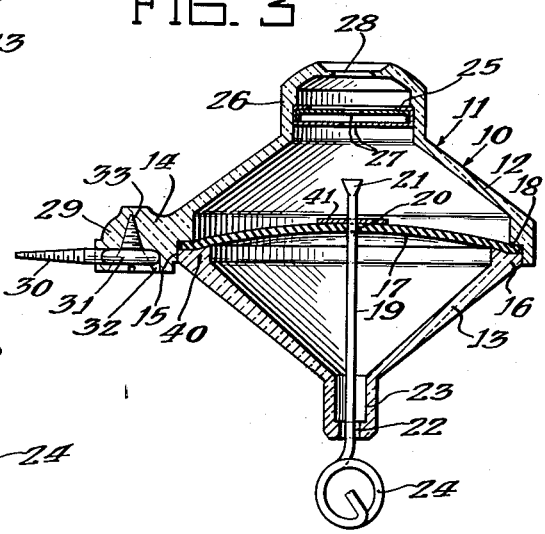
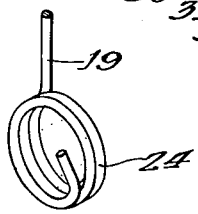
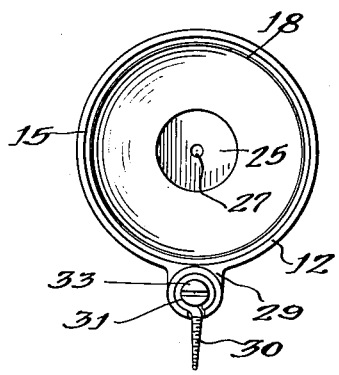
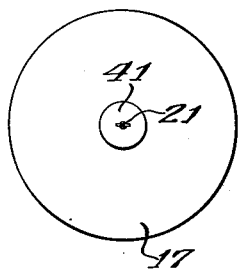
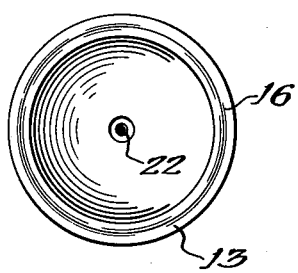
Inventor:
Sebastiano Lando
By Wallace and Cannon
His Attorneys Patented Sept. 2, 1952

2,608,784

UNITED STATES PATENT OFFICE 2,608,784

SIGNALING DEVICE

Sebastiano Lando, Chicago, Ill., assignor to Land-O-Tackle, Inc., Chicago, Ill., a corporation of Illinois Application April 15, 1950, Serial No. 156,064

4 Claims. (Cl. 43—17)

This invention relates to fishing tackle and, more particularly, to fishing tackle which embodies an audible signal for informing the user when he has a bite or so-called strike on his fish line.

An object of the present invention is to provide a fishing tackle embodying an audible signal and a novel device for actuating the audible signal, in a novel manner, by means of the fish line associated therewith.

Another object of the invention is to provide in the new fishing tackle a novel construction and arrangement for releasing the fish line from operative engagement with the new audible signal when a strike has been made on the fish line and the audible signal is actuated thereby.

A further object of the invention is to construct the new audible signal in such a manner that it may be readily mounted upon a fishing pole or upon a wall of a small boat, or upon a dock or pier, from which the user may wish to fish.

Another object of the invention is to provide a new and improved fishing tackle comprising a fishing rod or pole having the new audible signal device mounted thereon and operatively associated in a novel manner with a fish line slidably guided upon the said fishing rod or pole.

Other and further objects of the present invention will be apparent from the following description and claims and are illustrated in the accompanying drawing which, by way of illustration, show a preferred embodiment of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawing:

Fig. 1 is a longitudinal side elevational view, partly in section, illustrating the new audible signal fishing tackle mounted upon one end portion of a fishing rod or pole;

Fig. 2 is a side elevational view of the new audible fishing tackle and illustrating the manner in which the new audible signal fishing tackle may be mounted upon the wall of a small boat or upon a dock or pier;

Fig. 3 is a central vertical sectional view of the new audible fishing tackle illustrating the internal construction thereof;

Fig. 4 is a bottom plan view of the upper housing portion of the new audible signal fishing tackle illustrated in Figs. 1, 2 and 3;

Fig. 5 is a top plan view of the flexible diaphragm member which is embodied in the audible signal fishing tackle which is illustrated in Figs. 1, 2 and 3;

Fig. 6 is a top plan view of the lower housing portion of the new audible signal fishing tackle which is illustrated in Figs. 1, 2 and 3; and Fig. 7 is a fragmentary perspective view illustrating the lower end portion of the elongated flexible diaphragm-operating and fishing line-gripping stem or rod member which is embodied in the new audible signal fishing tackle which is illustrated in Figs. 1, 2 and 3.

A preferred embodiment of the new audible signal fishing tackle is illustrated in the drawing, wherein it is generally indicated at 10, and comprises a housing or casing 11 which is composed of an upper section 12 and a lower section 13. The parts of the housing or casing 11 are preferably formed of suitable synthetic resinous plastic material and the upper housing section 12 has a substantially annular flange 14 formed at the lower portion thereof. This flange 14 has a substantially annular recess 15 formed therein on its inner surface and the lower housing section 13 has a substantially annular flange 16 formed on its upper surface and this flange 16 is frictionally or adhesively secured in the substantially annular recess 15 in the upper housing section 12 so as to secure the upper and lower housing sections 12 and 13 together and in assembled relationship.

The new audible signal fishing tackle 10 includes audible signal-producing means comprising a movable member in the form of a flexible diaphragm member 17, which may be made of natural vulcanized rubber of any suitable synthetic elastomer or copolymer, such as the butadiene-styrene copolymers, or the like. This movable member or flexible diaphragm 17 is mounted in the housing 11 and has a peripheral flange portion 18 which extends into and is held in the substantially annular recess 15 in the flange 14 of the upper housing section 12 by the clamping engagement of the substantially annular flange 16 of the lower housing section 13 in the substantially annular recess 15 in the upper housing section 12.

As shown in Fig. 3 of the drawing, the lower housing section 13 has a substantially annular shoulder 40 formed in its inner and upper surface and this shoulder 40 is inclined slightly upwardly from its outer to its inner end so as to retain the flexible diaphragm in the position shown, arched or inclined slightly upwardly from its outer edge toward the center thereof.

The new audible signal fishing tackle 10 includes an operating stem or rod 19 for the movable member or flexible diaphragm 17 and this operating rod or stem 19 is slidably projected through a centrally arranged opening 20 which is formed in the flexible diaphragm member 17, and this operating stem or rod 19 has an enlarged head 21 formed thereon at its inner and upper end. A reenforcing disc 41 of metal or other suitable material is mounted centrally on the upper surface of the flexible diaphragm 17 and is centrally apertured for the passage of the operating rod or stem 19 (Fig. 3). The operating stem or rod 19 is also slidably projected through an opening 22 formed in a boss 23 which is formed centrally upon the bottom housing section 13. The operating stem or rod 19 has a convoluted lower end portion 24 which projects exteriorly of the housing 12, below the boss 22.

A pair of flanged discs 25 are mounted in spaced relationship in a reduced upper end portion 26 of the upper housing section 12 and each of these discs 25 has a centrally arranged air inlet and air outlet aperture 27 formed therein. The apertured discs 25 may be made of metal, resinous plastic, rubber, or other suitable material, and may be mounted in the reduced upper end portion 26 of the upper housing section 12 in any suitable manner, as by means of a suitable adhesive, a frictional fit, or otherwise.

An air inlet and exit aperture 28 is formed centrally in the top wall of the reduced upper end portion 26 of the upper housing section 12 (Fig. 3).

The upper housing section 12 has a laterally extending boss or arm 29 formed thereon, upon the substantially annular flange 14, and this boss or arm 14 has a fastening element, in the form of a threaded hook 30 mounted thereon. This hook 30 has an eye portion 31 which is fastened by means of a screw 31 in a recess 32 which is formed in the arm or boss 29 (Fig. 3).

The new audible signal fishing tackle is shown in Fig. 1 of the drawing as being detachably mounted upon the end portion 34 of a fishing rod or pole 35, and to accomplish this result the threaded fastening element or hook 30 may be screwed into the end portion 34 of the fishing rod or pole 35.

The fishing rod or pole 35 embodies guide loops or members 36 for guiding a fish line 37.

In the use of the new audible signal fishing tackle, in the manner illustrated in Fig. 1, the new audible signal fishing tackle may be mounted upon the end portion 34 of a fishing rod or pole 35 by securing the fastening element or hook 30 into the end portion 34 of the fishing rod or pole 35, as shown in Fig. 1, whereupon the fish line 37 may be passed through the guide loops 36 and thence inserted between two of the convolutions in the convoluted end portion 24 of the operating stem or rod 19. To accomplish this result, it is merely necessary to spread the convolutions 24 apart somewhat, by means of the fingers or a suitable instrument, and then insert the fish line 27 between the thus spaced convolutions 24, and upon release of the thus spread convolutions 24 the same will return to their normal position and will frictionally grip the fish line 37 and releasably hold it between the said convolutions 24.

Accordingly, when the new audible signal fishing tackle is thus arranged, as in Fig. 1 of the drawing, and the fisherman gets a bite or strike upon the fish line 37, the pull of the fish upon the fish line 37 will exert sufficient force upon the convoluted end portion 24 of the operating stem or rod 19 to pull the latter downwardly from its normally somewhat upwardly arched position, as in Fig. 3 of the drawing, thereby increasing the cubic volume of the upper air chamber formed between the flexible diaphragm 17 and the inner surface of the upper housing section 12. During this operation air is drawn into the upper chamber in the housing 12, through the air apertures 28 and 27. As the operating rod or stem 19 and the flexible diaphragm 17 are thus drawn downwardly the operating rod or stem 19 slides in the opening 20 in the flexible diaphragm 17 and as the operating rod or stem completes its downward stroke the enlarged upper head portion 21 thereof engages the reenforcing disc 41 and the downward flexing action of the diaphragm 17 is thus completed. However, after the downward movement of the operating rod or stem 19 is thus completed continued pull of the fish upon the line 37 pulls the fish line 37 from between the convolutions of the convoluted lower end portion 24 of the operating stem or rod 19 and thereby releases the fish line 37 from its frictional engagement with and between the convolutions 24 of the operating stem or rod 19.

When the fish line 37 is thus released from engagement with the convoluted lower end portion 24 of the operating stem or rod 19 the flexible diaphragm 17 is urged, under and by the force of its own resiliency, back into its normally upwardly arched position, as in Fig. 3, and this motion of the flexible diaphragm 17 tends to expel air rapidly from the upper portion of the housing 11, through the apertures 27 in the discs 25 and thence outwardly of the housing 11 through the aperture 28. This rapid escape of air from the housing 11 creates an audible whistling sound or signal to inform the fisherman of the strike or bite upon the fish line 37.

It will be noted that in the use of the new audible signal device the desired audible whistle signal is given by the new audible signal fishing tackle without damage, or likelihood of damage, thereto since the fish line 37 is released from frictional engagement with the operating stem or rod 19 immediately following the strike upon the fish line 37, and the creation of the desired audible signal, so that continued pull of the fish upon the audible signal and resulting probable damage thereto is avoided.

The new audible signal device 10 is shown in Fig. 2 of the drawing as applied to and mounted upon the wall 38 of a suitable supporting structure 39 which may be the end wall or gunwale of a row boat, or small power driven boat, or the wall of a boat pier or dock. In this instance the fish line 37a is projected between the spaced convolutions 24 of the operating stem or rod 19, in the same manner as the fish line 37 is employed in the use of the new audible signal device, as shown in Fig. 1, but the fish line 37a is not guided through guide loops 36, such as are used upon the fishing rod or pole 35.

It will thus be seen from the foregoing description, considered in conjunction with the accompanying drawing, that the present invention has the desirable advantages and characteristics, and accomplishes its intended objects, including those

I claim:

1. An audible signal fishing tackle comprising a housing, audible signal-creating means including a flexible diaphragm mounted in and extending across said housing between the upper and lower ends thereof and having an operating stem or rod attached thereto, said operating stem or rod including a portion projecting exteriorly of said housing and embodying gripping means for frictionally and releasably gripping a fish line so that when a strike occurs upon the fish line said fish line will exert a pull upon the said operating stem or rod and thereby exert a flexing action upon the said flexible diaphragm and the line will be released from said gripping means by a continued pull thereon after the operating stem or rod completes the operation of flexing the diaphragm.

2. An audible signal fishing tackle as defined in claim 1 in which the means for releasably gripping the fish line is in the form of a plurality of convolutions adapted frictionally and releasably to grip a fish line therebetween.

3. Fishing tackle comprising, in combination, a fishing pole or rod employing fish line guiding means having a fishing line slidably projected therethrough, an audible signal device including a housing detachably attached to an end portion of the fishing pole or rod, audible signal means in the housing including a flexible diaphragm extending across the housing and having an operating stem or rod attached thereto and including a portion projecting exteriorly of the housing and embodying means for frictionally and releasably gripping a portion of the fish line so that the operating stem or rod is pulled downwardly and the flexible diaphragm is flexed by a pull upon the fish line and the fish line is released from frictional engagement with the operating stem by a continued pull on the line or rod at the completion of the downward movement of the operating stem or rod.

4. Fishing tackle as defined in claim 3 in which the operating stem or rod is in the form of a wire rod having a convoluted lower end portion projecting exteriorly of the housing and embodying spaced convolutions adapted frictionally and releasably to grip a fish line therebetween.

SEBASTIANO LANDO.

REFERENCES CITED

The following references are of record in the file of this patent:

UNITED STATES PATENTS

| Number | Name | Date |
|---|---|---|
| 495,863 | Whitzel | Apr. 18, 1893 |
| 522,352 | Poppowitsch | July 3, 1894 |
| 589,500 | Freeman | Sept. 7, 1897 |
| 657,518 | Cook | Sept. 11, 1900 |
| 935,877 | Woesley et al. | Oct. 5, 1909 |
| 1,737,921 | Derr | Dec. 3, 1929 |
| 2,421,068 | Jamerson | May 27, 1947 |
| 2,446,427 | Linder | Aug. 3, 1948 |